C. D. JENNEY.
AUTOMOBILE STARTER.
APPLICATION FILED JUNE 22, 1911.
1,022,087.
Patented Apr. 2, 1912.
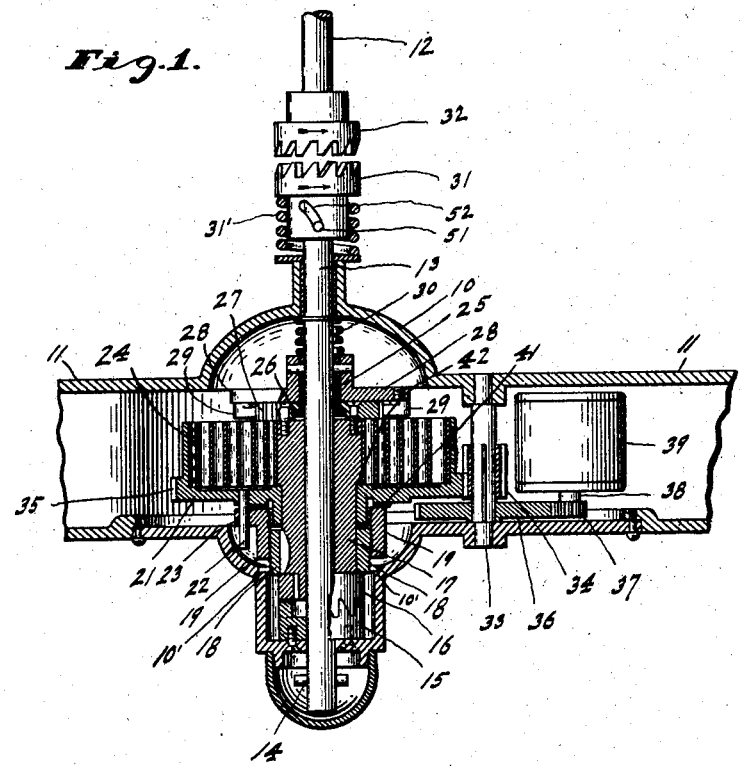
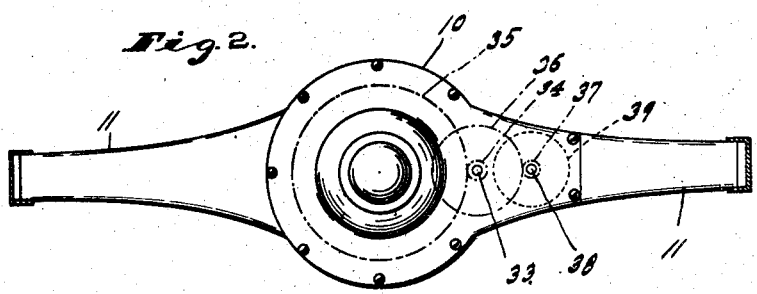
Witnesses
Frank A. Sahli
May Layden
Inventor
Charles D. Jenney,
By Arthur M. Hood
Attorney

UNITED STATES PATENT OFFICE.

CHARLES D. JENNEY, OF INDIANAPOLIS, INDIANA.

AUTOMOBILE-STARTER.

1,022,087.  Specification of Letters Patent.  Patented Apr. 2, 1912.

Application filed June 22, 1911. Serial No. 634,751.

*To all whom it may concern:*

Be it known that I, CHARLES D. JENNEY, a citizen of the United States, residing at Indianapolis, in the county of Marion and State of Indiana, have invented a new and useful Automobile-Starter, of which the following is a specification.

The object of my invention is to produce an apparatus which may be used for the ready starting of automobile engines without the necessity of manually cranking the same.

The apparatus may take a considerable number of forms but I prefer to so construct it that the major portion thereof may be standard and readily attached to any make of automobile by convenient attaching members which may be especially designed for each make of automobile or may be made adjustable.

The accompanying drawings illustrate my invention.

Figure 1 is an axial section and Fig. 2 an end elevation.

In the drawings, 10 indicates a suitable inclosing casing within which the apparatus is mounted and said casing is preferably provided with a pair of oppositely extending arms 11, 11 suitably formed for attachment to the frame of an automobile in proper position to connect with the engine shaft 12 in a manner to be described. Journaled within the casing 10 is a shaft 13 which, at its forward end, at 14 is formed to receive the usual hand crank. Surrounding shaft 13 and secured within casing 10 is a stationary clutch member 15 which is adapted to receive and coöperate with a clutch member 16 carried by a spring sleeve 17 which is journaled freely upon shaft 13. Secured to sleeve 17 so as to rotate therewith, is a threaded flange 18 which is threaded into a nut 19. Journaled upon sleeve 17 is a winder 21 to which nut 19 is rotatively connected in such manner as to permit relative axial movement. The winder 21 may conveniently be a casing for the spring. A convenient means for making this connection comprises one or more axially extending pins 22 carried by the spring casing 21 and projected freely through holes 23 formed in a portion of nut 19.

Arranged within spring casing 21 is a sufficiently heavy volute spring 24, one end of which is attached to the spring sleeve 17 and the other to the winder or spring casing 21.

Keyed to shaft 13 is a bushing 25 provided at one end with a circumferential flange 26 which interlocks with a ratchet wheel 27 secured to sleeve 17. Mounted upon bushing 25 and keyed thereto so as to rotate with shaft 13, is a pawl-carrying member 28 carrying pawls 29 formed to engage the ratchet wheel 27 in such manner that unwinding rotation of spring 24 will drive shaft 13 in the direction indicated by the arrow. A spring 30 serves to normally drive all of the parts thus far described to a position indicated in Fig. 1, where clutch member 16 is in engagement with clutch member 15. Secured to the end of shaft 13 so as to rotate therewith is a clutch member 31 which is adapted to coöperate with a clutch member 32 carried by shaft 12, said last mentioned clutch members being normally out of engagement with each other. The connection between shaft 13 and clutch 31, is preferably a yielding one conveniently formed by pin 51, diagonal slot 52 and spring 31'. Any other separable connection between shafts 13 and 12 will of course serve the same purpose.

Journaled within casing 10 is a counter shaft 33 provided with a small pinion 34 meshing with a gear 35 secured to or formed upon spring casing or winder 21, one or the other of the gears 34 and 35 having sufficient axial length to maintain mesh of the gears throughout the axial movement of the spring casing 21. Also carried by shaft 33 is a larger gear 36 which is meshed with a pinion 37 carried by the shaft 38 of a small motor 39 preferably mounted within or upon casing 10. This motor 39 may be of any desired type, such, for instance, as an electric motor or a fluid pressure motor, and suitable means for starting and stopping this motor will be carried to the cab of the automobile. Because of the very considerable speed reduction between the motor 39 and the gear casing 21, the said motor may be of very low power.

The operation is as follows: Starting with the parts in the position shown in Fig. 1, in order to give the engine shaft 12 a sufficient number of revolutions to start the engine, the operator will cause motor 39 to move forward. This will slowly wind up spring 24, casing 21 rotating freely upon sleeve 17 which will be held against rotation by clutches 15 and 16. During this winding action of spring 24, nut 19 will be turned by the spring casing 21 upon the threads 18 until it engages casing 10 at 10′, whereupon rotation will continue and sleeve 17, and shaft 13, as well as all of the parts carried thereby, will be driven axially to the right, first entering clutch 31 into clutch 32 and finally withdrawing clutch 16 from clutch 15. If the crowns of the teeth of the two clutch members engage, the pin 51 and slot 52 cause the clutch member 31 to turn to the right, or in the direction of the arrow, as the endwise movement of the shaft continues; thus eventually producing the proper intermeshing of the teeth of the clutch members 31 and 32. As soon as clutch 16 is withdrawn from clutch 15, spring 24 will have been fully wound and sleeve 17 being thus freed for forward rotation, ratchet 27, acting upon pawls 29, will drive shaft 13 forwardly and thus forwardly rotate shaft 12 and start the engine. The forward rotation of sleeve 17 will rotate the threads 18 within nut 19 and will thus cause nut 19 to move toward casing 21 until it engages an interposed washer 41 so as to crowd casing 21 over against shoulder 42 of sleeve 17 and thus prevent too great an unwinding of spring 24. Practically at this instant the engine connected with shaft 12 will have started forward under its own power and clutch 32 will therefore drive clutch 31 to the left so as to throw it out of engagement, spring 31′ yielding during this movement, if necessary, while clutch 16 is seating clutch 15. Forward rotation of clutch 16 will, of course, cease immediately upon its entrance into clutch 15 and there will be some slight further forward rotation of clutch 31 thereafter, but this relative movement of the two clutch members 31 and 16 will be permitted by reason of the ratchet connection 28, 29, 27 between the two clutch members. If, by chance, the engine should not start under the first operation of the device, spring 30 will serve to return all of the parts to normal position as soon as they come to rest and the operator may then again start the small motor 39 so as to repeat the operation just described.

I claim as my invention:

1. An engine starter comprising a spring, a connecting member carried by one end of said spring for connection with the engine, means for temporarily restraining said member from forward movement, a small motor, intermediate connections between said motor and the other end of the spring whereby said spring may be potentialized by the motor, and means by which the spring may be automatically connected to an engine upon potentialization of said spring.

2. An engine starter comprising a spring, a releasable connecting member carried by one end of said spring for connection with the engine, means for temporarily restraining said member from forward movement, a small motor, and intermediate connections between said motor and the other end of the spring whereby said spring may be potentialized by the motor.

3. An engine starter comprising a shaft, a clutch member carried by said shaft and formed for engagement with an engine shaft, a spring-sleeve journaled on said shaft, a clutch member carried by said spring-sleeve, a stationary clutch member separably coöperating with said spring-sleeve clutch member, a threaded member carried by said spring-sleeve, a winder rotatable relative to the spring-sleeve, a spring connecting the said winder and spring-sleeve, a threaded member carried by the winder and threaded upon the threaded member carried by the spring-sleeve, said two threaded members being relatively axially movable to cause alternate separation and reëstablishment of the clutching engagement between the spring-sleeve and the stationary clutch and between the shaft and the engine, a small motor, and a speed-decreasing driving train between said motor and the winder.

4. An engine starter comprising a shaft, a clutch member carried by said shaft and formed for engagement with an engine shaft, a spring-sleeve journaled on said shaft, a clutch member carried by said spring-sleeve, a stationary clutch member separably coöperating with said spring-sleeve clutch member, a threaded member carried by said spring-sleeve, a winder rotatable relative to the spring-sleeve, a spring connecting the said winder and spring-sleeve, and a threaded member carried by the winder and threaded upon the threaded member carried by the spring-sleeve, said two threaded members being relatively axially movable to cause alternate separation and reëstablishment of the clutching engagement between the spring-sleeve and the stationary clutch and between the shaft and the engine.

5. An engine starter comprising a main casing, a shaft journaled therein, a clutch member carried by said shaft and adapted to engage an engine shaft, a spring-sleeve journaled upon said shaft, a clutch member carried by said spring-sleeve, a stationary clutch member from which the spring-sleeve clutch member is axially withdrawable, a winder journaled on the spring-sleeve, a spring connecting the winder and spring-sleeve, a threaded member carried by the spring-sleeve, a threaded member rotatably carried by the winder and axially movable thereon, said threaded member coöperating with the spring-sleeve threaded member and, at times, abutting against the casing, and a driving connection between the spring sleeve and the shaft operating in one direction only.

6. An engine starter comprising a main casing, a shaft journaled therein, a clutch member carried by said shaft and adapted to engage an engine shaft, a spring-sleeve journaled upon said shaft, a clutch member carried by said spring-sleeve, a stationary clutch member from which the spring-sleeve clutch member is axially withdrawable, a winder journaled on the spring-sleeve, a spring connecting the winder and spring-sleeve, a threaded member carried by the spring-sleeve, a threaded member rotatably carried by the winder and axially movable thereon, said threaded member coöperating with the spring-sleeve threaded member and, at times, abutting against the casing, a driving connection between the spring sleeve and the shaft operating in one direction only, a small motor, and a speed-decreasing driving train between said small motor and the winder.

7. An engine starter comprising a spring, a clutch member carried by one end of said spring for connection with the engine, means for temporarily restraining said clutch member from forward movement, a motor, and means whereby the operation of the motor potentializes the spring and releases said restraining means.

8. An engine starter comprising a shaft, a clutch member carried by said shaft and formed for engagement with an engine shaft, a spring-sleeve journaled on said first shaft, a clutch member carried by said spring-sleeve, a stationary clutch member separably coöperating with said spring-sleeve clutch member, a winder rotatable relatively to the spring-sleeve, a spring connecting said winder and said spring-sleeve, a member having a threaded mounting on either said winder or said spring-sleeve and a connection with the other of said two members which permits relative axial movement only, and means coöperating with said threaded member for controlling the engagement or disengagement of the various clutch members.

9. An engine starter comprising a shaft, a clutch member carried by said shaft and formed for engagement with an engine shaft, a spring-sleeve journaled on said first shaft, a clutch member carried by said spring-sleeve, a stationary clutch member separably coöperating with said spring-sleeve clutch member, a winder rotatable relatively to the spring-sleeve, a spring connecting said winder and said spring-sleeve, a member having a threaded mounting on either said winder or said spring-sleeve and a connection with the other of said two members which permits relative axial movement only, means coöperating with said threaded member for controlling the engagement or disengagement of the various clutch members, and power-operated means for turning said winder.

10. An engine starter comprising a shaft, a clutch member slightly movable helically relatively to said shaft, a spring forcing said clutch member to one limit of its movement, a spring for driving said shaft, and means operated by the potentialization of said spring for moving said shaft endwise to cause engagement between the aforesaid clutch member and a clutch member on the engine shaft.

11. An engine starter comprising two shafts, one of them being permanently connected to the engine shaft and the other being axially movable, a clutch member carried by each of said shafts, one of said clutch members being mounted upon its shaft so as to have a slight helical movement relatively thereto, a spring forcing said clutch member to one end of its movement, so that when the two clutch members are brought into engagement by the endwise movement of the movable shaft the helical connection will cause a relative turning of the two clutch members to produce proper engagement in case the first engagement is unsuitable, and a spring for operating said endwise movable shaft both rotatively and axially.

In witness whereof, I have hereunto set my hand and seal at Indianapolis, Indiana, this seventeenth day of June, A. D. one thousand nine hundred and eleven.

CHARLES D. JENNEY. [L. S.]

Witnesses:
FRANK A. FAHLE,
MAY LAYDEN.

---

Copies of this patent may be obtained for five cents each, by addressing the "Commissioner of Patents Washington, D. C."